United States Patent [19]

Kawabata et al.

[11] Patent Number: 4,783,833

[45] Date of Patent: Nov. 8, 1988

[54] METHOD OF EXTRACTING AN IMAGE OF A MOVING OBJECT

[75] Inventors: Atsushi Kawabata; Shinya Tanifuji; Yasuo Morooka, all of Hitachi, Japan

[73] Assignee: Hitachi, Ltd., Tokyo, Japan

[21] Appl. No.: 935,260

[22] Filed: Nov. 26, 1986

[30] Foreign Application Priority Data

Nov. 27, 1985 [JP] Japan .................................. 60-264855

[51] Int. Cl.⁴ ................................................ G06K 9/00
[52] U.S. Cl. ...................................... 382/22; 358/105; 358/135
[58] Field of Search ................. 382/22; 358/105, 135, 358/136

[56] References Cited

U.S. PATENT DOCUMENTS

| | | | |
|---|---|---|---|
| 4,160,998 | 7/1979 | Kamin | 358/105 |
| 4,220,967 | 9/1980 | Ichida et al. | 358/105 |
| 4,494,140 | 6/1985 | Michael | 358/105 |
| 4,546,383 | 10/1985 | Abramatic et al. | 358/135 |
| 4,677,476 | 6/1987 | Kondo | 358/105 |

Primary Examiner—Leo H. Boudreau
Attorney, Agent, or Firm—Antonelli, Terry & Wands

[57] ABSTRACT

A method of extracting an image of a moving object comprises the steps of extracting edge-enhanced input image from an input image taken by an image pick-up element moving in a plane perpendicular to an optical axis, recollecting a background edge-enhanced image from the input edge image, transfer in parallel horizontally and vertically the background edge-enhanced edge image so to correspond to an input edge-enhanced image forwarded successively; extracting an edge image of a moving object by extracting the background edge-enhanced image from the input edge-enhanced image, and renewing the background edge enhanced image based on weighted mean of the background edge enhanced image and the input edge image.

8 Claims, 7 Drawing Sheets

| 0 | -1 | -1 | 0 |
|---|----|----|---|
| -1 | 2 | 2 | -1 |
| -1 | 2 | 2 | -1 |
| 0 | -1 | -1 | 0 |

| 0 | -1 | 0 |
|---|----|---|
| -1 | 4 | -1 |
| 0 | -1 | 0 |

PICTURE STORAGE PLANE

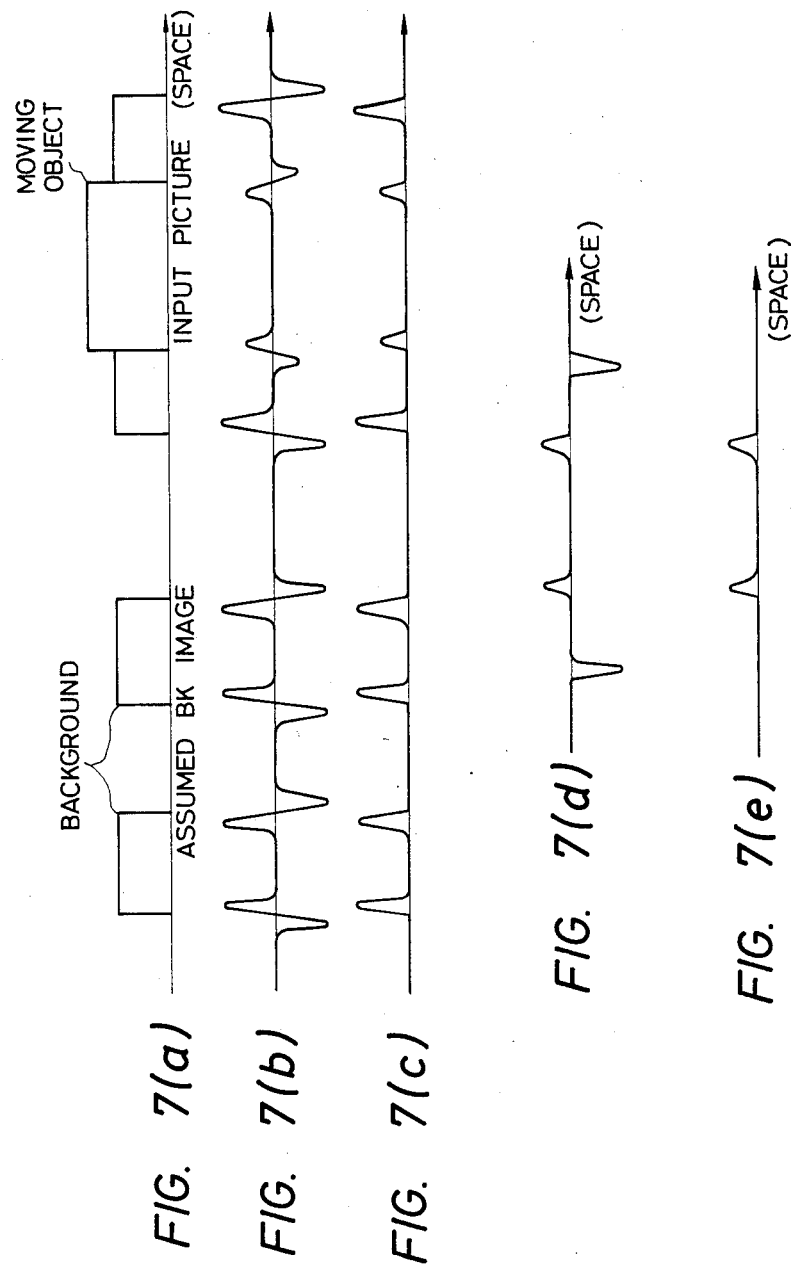

METHOD OF EXTRACTING AN IMAGE OF A MOVING OBJECT

BACKGROUND OF THE INVENTION

The present invention relates to a method of processing a moving picture, and particularly relates to a picture-processing method of extracting an image of a moving object, which is suitable for a process in which an edge image of a moving object is extracted from a moving picture inputted successively in real time from an image pick-up element moving within a plane perpendicular to an optical axis.

Conventional systems for processing pictures relating to an image of a moving object execute the process by using values obtained from time differentiation or other similar operations with respect to each picture element of a moving picture inputted successively. The time differentiation or similar operations by an electronic circuit can be executed at a very high speed, since this circuit has a simplified construction. It is difficult, however, to extract an image of a moving object only from the values obtained from the time differentiation or similar operations. When a circular area shifts its position before a plain background, for instance, crescent-shaped areas having different signs are outputted in the front and the rear in the shifting direction, and it is hard to extract the circular area from these pieces of information.

There is another method, in this connection, in which images obtained from an image pikk-up element in a conventional manner are stored once in a storage device, pictures are then taken out one by one from the storage device, and the respective corresponding point of each picture is calculated so as to extract an image of a moving object. While the image of a moving object can be extracted correctly according to this method when the corresponding point can be found, since an amount of movement of the object is calculated correctly in this case, a longer time is required for processing said point. It is very difficult, in addition, to detect the corresponding point in the case where there is a rotation, a change in shape or other change of the object.

There is still another known method in which only an image of a background wherein the image of a moving object is not contained is stored beforehand in a device, and images inputted successively are compared with the image of the background so as to extract the image of the moving object. This method can not be applied at all when the image pick-up element is moved or when the background changes. In Japanese Patent Laid-Open No. 8087/1984, a mechanism for renewing an image of a background is contained. By using this mechanism, instantaneous images not containing an image of a moving object are taken successively in a device and stored as a background image therein. This is a contrivance avoid regarding a slow change in time of the background mistakenly as an image of the moving object. According to this method, however, the renewal of the image of the background is not conducted at all when the moving object is present constantly within a pick-up scope, for instance, and it is impossible to cope with a sharp instantaneous change of the background. In addition, this method is also ineffective when the image pick-up element is moved.

SUMMARY OF THE INVENTION

An object of the present invention is to furnish a picture-processing system which enables the extraction of an edge image of a moving object in real time and with high precision from a moving picture obtained from an image pick-up element which is moved within a plane perpendicular to an optical axis.

The present invention resides in that an unchanged feature portion or a slowly-changing feature component of an input image, obtained from an image pick-up element, is taken and stored as a background, an image of the background is transferred vertically and horizontally so that this image of the background may correspond to an image inputted afresh, the stored data on the background made to correspond to the inputted image by the transfer is compared with feature parameters of a picture inputted every moment, and information on a moving object is extracted from the comparison.

BRIEF DESCRIPTION OF THE DRAWINGS

FIGS. 7(a) to 7(e) are illustrational diagrams for explaining processes wherein an edge image of a moving object is formed;

DESCRIPTION OF THE INVENTION

Figure 1:
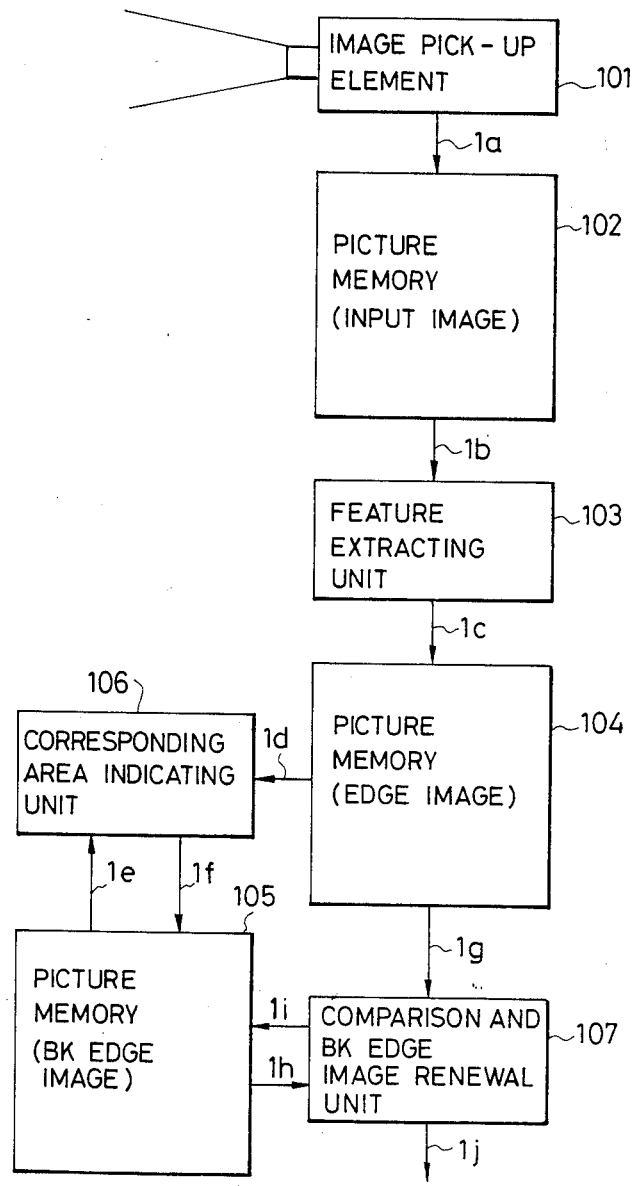
FIG. 1 is a block diagram of an embodiment of a system for extracting an image of a moving object according to the present invention.

An embodiment of the present invention is described hereunder in detail, referring to the drawings.

In FIG. 1 showing a system for extracting an image of a moving object according to the present invention, numeral 101 denotes an image pick-up element which is movable in a plane perpendicular to an optical axis, picks up pictures so as to cover a prescribed pick-up scope wherein a moving object is contained, and delivers outputs 1a such as ordinary video signals from the image pick-up element 101 to a picture memory 102.

Figure 2:
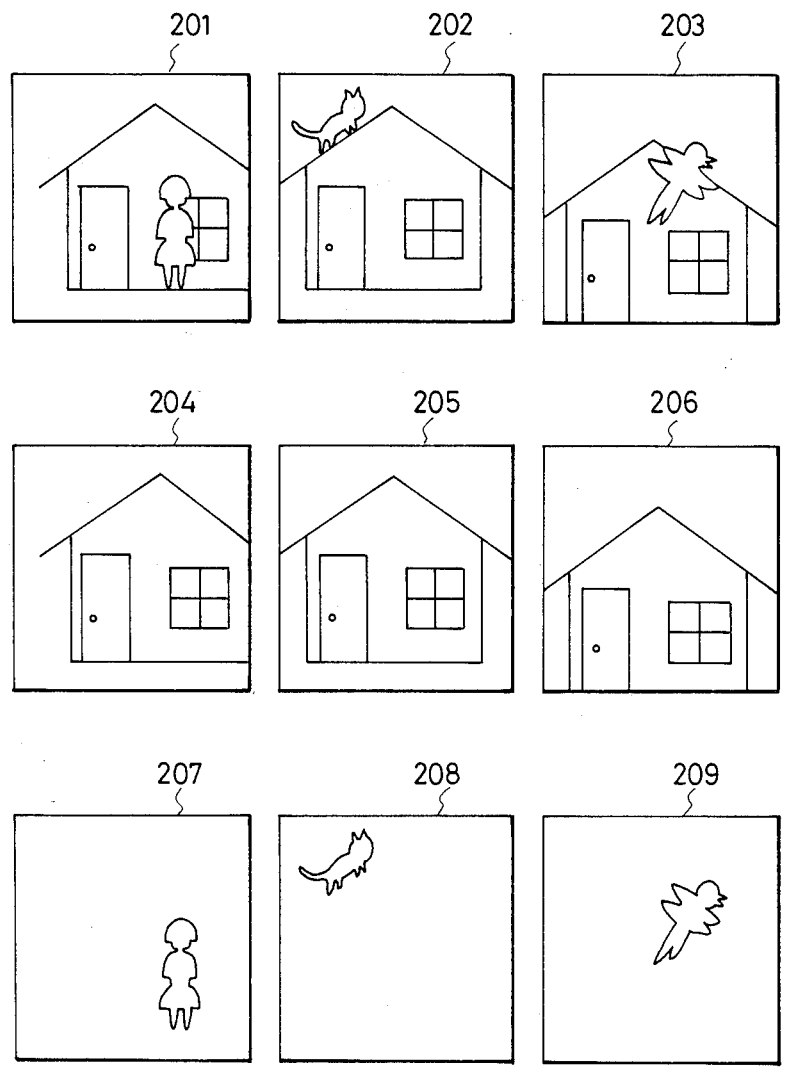
FIG. 2 is illustrational views of picture frames for showing processes wherein an image of a moving object is extracted from an input picture.

The image pick-up element 101 moving in a plane perpendicular to an optical axis picks up such scenes 201, 202 and 203 as illustrated in FIG. 2. In the pictures picked up, a moving object (a child, a cat or a bird, in this case) is contained in a stationary or slowly changing background (a house, in this case, which is slowly changed in the picture).

The picture memory 102 is an ordinary memory in which the video signals 1a are converted into digital signals through an A/D converter not shown, and these signals of picture data are then stored therein one frame at a time. The picture memory 102 outputs digital signals 1b of an input image stored in the picture memory 102 sequentially one by one of the picture elements of the input image to a feature extracting unit 103. The feature extracting unit 103 extracts an edge enhanced image of the input image stored in the picture memory 102. Namely, the feature extracting unit 103 takes in picture element data 1b sequentially from the picture memory 102 and extracts edges from the input image, and then the results of the extraction, which are data 1c relating to the edge image of the input image data 1b, are forwarded to a picture memory 104 for storing an edge-enhanced image. The data 1c of the edge image is stored in the picture memory.

Figures 3A, 3B, 6:
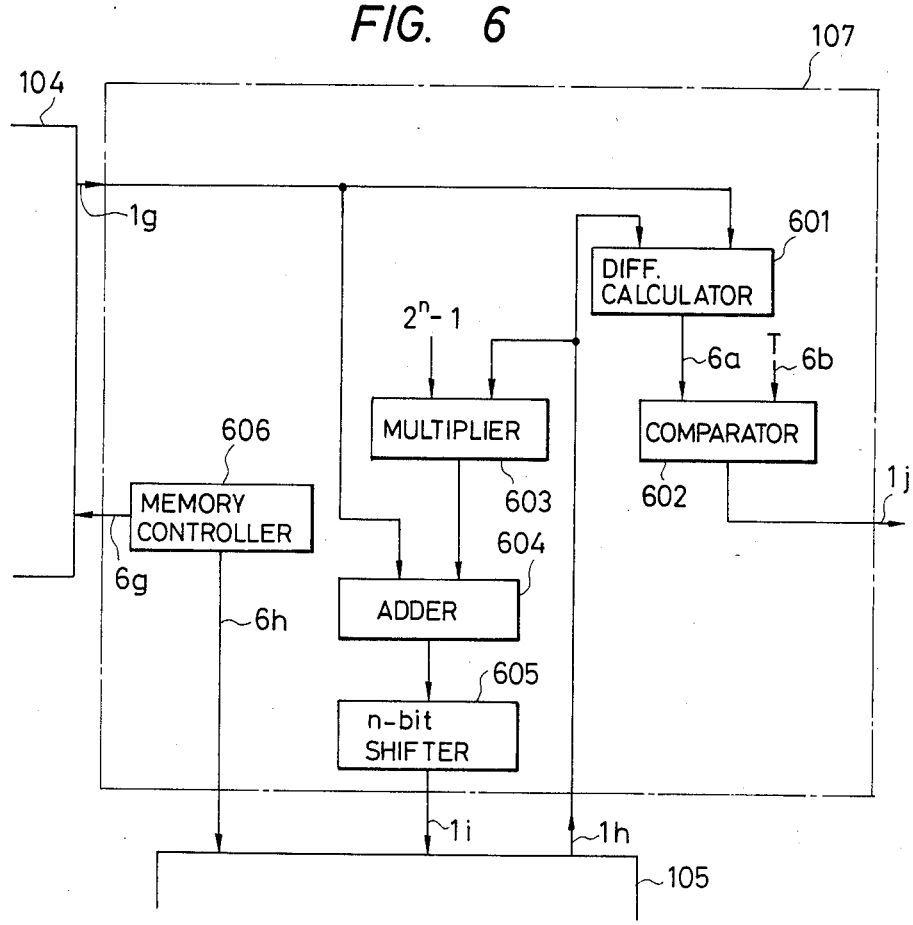
FIGS. 3(a) and 3(b) are illustrative diagrams showing coefficients of a spatial filter employed when an edge is extracted.
FIG. 6 is a block diagram of a comparison and background edge image renewal unit.

It is known generally in the field of psychology that contours play a very important role in the recognition of an object by man. Based on this knowledge, the feature extracting unit 103 is provided for obtaining an edge image of a moving object. In the field of picture processing, a spatial filter as shown in FIG. 3(a) has been used heretofore for extracting a contour (a portion wherein lightness is sharply varied spatially). Each numerical value in FIG. 3 represents a coefficient of convolutional integration. In general, the lightness is varied sharply on the boundary of an object, and when this filter is applied to the vicinity of said boundary, the value of the convolutional integration turns to be a large positive or negative value. The output of the convolutional integration turns to be a value approximating zero inside the object, since the lightness is varied gently therein. Contours can be extracted by conducting said convolutional integration around all the picture elements of the picture data stored in the memory 102. When applied to such a moving picture dealt with by the present invention, however, the spatial filter of FIG. 3(b) brings forth problems as stated below:

(1) A slippage of about one picture element often occurs in a picture owing to a slippage of a sync signal between frames; and (2) The filter of FIG. 3(b) acts to enhance the noises that are superposed on each separate picture element of the picture due to various factors.

Therefore, in the present invention, a spatial filter as shown in FIG. 3(a) is applied as a filter suitable for extracting the edge image of a moving object in a moving picture. In the filter of FIG. 3(a), the expansion of a weight coefficient is made larger than that in the filter of FIG. 3(b) so as to cope with the problems of synchronization of the picture between frames and of separate noises. The arithmetic device of the spatial filter is a publicly-known processing device which is provided with sixteen multipliers and executes at high speed sum-of-products operations of sixteen-neighbors with respect to the picture.

The picture memory 104 is a storage device for storing the data of the edge image of the input image, which is stored in the picture memory 102 and outputted from the feature extracting unit 103, by one picture plane or one frame of an edge image.

The picture memory 105 stores one frame of the edge image corresponding to a background equivalent in dimensions to a scope that can be picked up at one time by the image pick-up element 101, that is, it stores an edge-enhanced background image of one frame. Namely, the picture memory 105 recollects background images such as images 204, 205, 206 in FIG. 2, corresponding to the input images 201, 202, 203. The picture memory 105 has a specific structure in which an edge image in a scope equivalent to the scope which can be covered at one time as the image pick-up element 101 can be stored by one picture frame, and in which the top and bottom of a picture plane or picture frame, and the right and left thereof are connected to each other, respectively, thereby to be made continuous, and the picture can be transferred in parallel with ease.

Figure 4A:
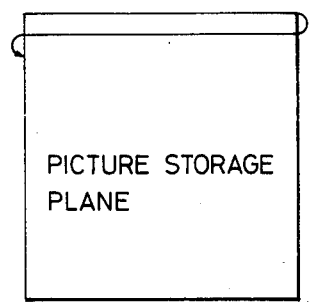
FIGS. 4(a) and 4(b) are illustrative views showing a construction of a memory.
Figure 4B:
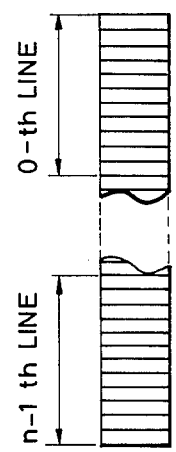
Figure 5:
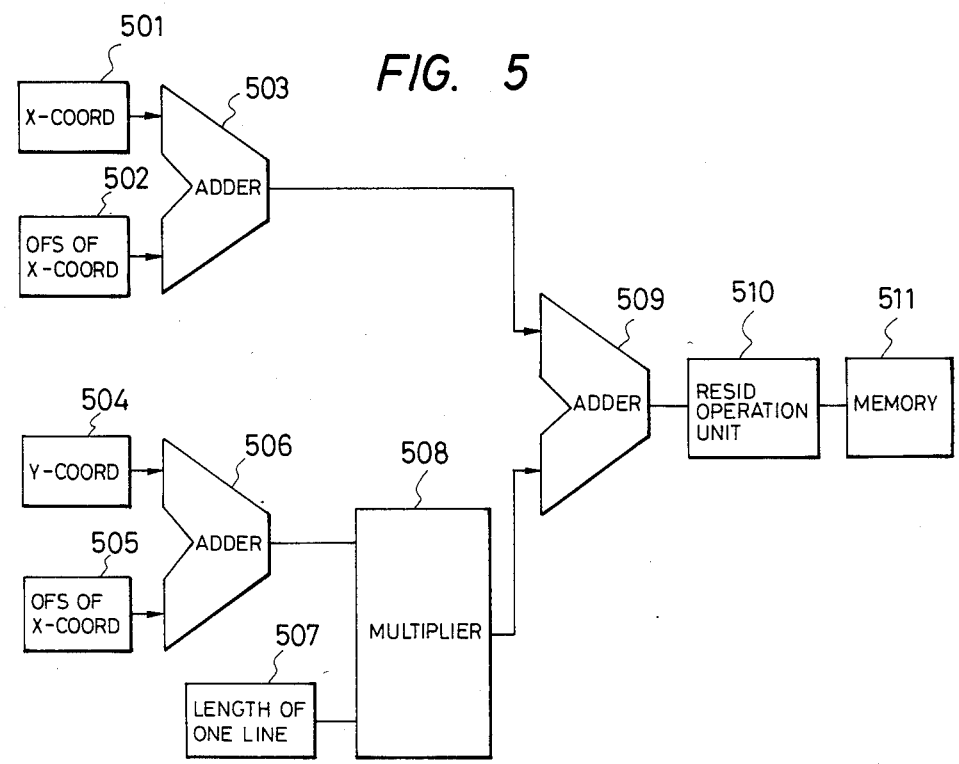
FIG. 5 is a block diagram of an address information forming mechanism.

A picture is usually stored in a region having consecutive addresses in a storage device, as shown in FIG. 4b. Accordingly, the right and left of the stored picture are usually connected together as shown in FIG. 4a. When a mechanism as shown in FIG. 5 is attached, as an address computing mechanism, to said storage device, a picture storage plane is made to have a structure wherein the top and bottom thereof are connected together, and moreover, the picture stored therein can be transferred in parallel on an assumed basis. The thus formed storage device is the above-mentioned picture memory 105.

In the mechanism shown in FIG. 5, numerals 501, 504 denote input values of an x-coordinate and a y-coordinate on the picture respectively, while numerals 502 and 505 denote values representing which position on the actual storage device the origin of the picture comes to. A y-coordinate value is multiplied by a length of one line by a multiplier 508, and the address on the storage device is computed by adding an x-coordinate value to the product of the above multiplication. From the value thus calculated, the residue is calculated dividing the value with the size of one picture plane as a divisor, using a residue operation unit 510. When the picture plane is constructed by 256×256, for instance, the calculation of said residue is required only to put out the lower 16 bits in dual representation of an output of 509, and therefore it can be realized very easily. By using the picture memory associated with the aforesaid mechanism, the origin of the picture information stored in the memory 105 can be transferred easily, and as a result, the picture can be transferred in parallel.

Numeral 106 in FIG. 1 denotes a mechanism or a corresponding area indicating unit which calculates an amount of the parallel transfer of a background edge enhanced image stored in the memory 105 so that the background edge image may correspond to the edge image stored in the picture memory 104. The unit 106 generates signals for recollecting the background images as shown by 204 to 206 of FIG. 2. Namely, the corresponding area indicating unit 106 calculates and indicates the direction of the transfer of the background edge image in the picture memory 105, which direction of transfer is necessary for making the image therein correspond to the edge image in the picture memory 104, by computing a correlation function of the edge image in the picture memory 104 and the background edge image in the picture memory 105. The computation of the correlation function requires much time in general, and the execution thereof at a high speed requires very much time and a lot of hardware. In the present invention, therefore, high-speed correlation computation is enabled by little hardware on the basis of the following assumption.

The speed of picture processing is sufficiently higher than the speed of movement of the image pick-up element 101 in a plane perpendicular to the optical axis, and so the amount of transfer of a background image between successive pictures is equivalent at most to one picture element of the picture taken in by the picture pick-up element 101.

Based on the above-stated assumption, an area wherein the correlation is taken is limited to an area deviated by one picture element from the preceding corresponding picture. Deviation is assumed to occur in eight directions, i.e. upward, downward, right, left, right-upward, right-downward, left-upward and left-downward directions, and, in addition, the case of the position of a picture being unvaried can be assumed. Accordingly, the correlation is computed with respect to nine-neighbors. A background image is shifted in the direction in which a correlation value is maximum, and it is so modified as to correspond to an input picture. This operation is executed every time a picture is inputted, and thereby a background image corresponding to an input picture can be outputted constantly.

Numeral 107 denotes a comparison and background edge image renewal unit which compares with corresponding picture elements of two images (for example, an image 201, 202, 203 in FIG. 2 and background image 204, 205, 206) stored in the corresponding regions of the picture memories 104 and 105, respectively, and delivers an edge image of the moving object (for example, a moving image 207, 208, 209 in FIG. 2), while renewing the data stored in the picture memory 105 simultaneously.

The comparison and background edge image renewal unit 107 has a function of delivering information on an image of a moving object based on the comparison of each picture element in the picture memory 104 with a corresponding picture element of the edge image of a background in the picture memory 105 which is shifted in the direction of parallel transfer indicated by the unit 106, and a function of renewing the edge image of a background stored in the picture memory 105, based on the image in the picture memory 104.

The detailed construction of the comparison and background edge image renewal unit 107 is illustrated by means of a block diagram in FIG. 6. In FIG. 6, the unit 107 receives signals 1g and 1h of the corresponding picture elements sequentially from the picture memories 104 and 105, and computes the difference between signals 1g and 1h by a difference calculator 601 to output a signal 6a of the difference. The signal 6a is inputted to a comparator 602 to compare it with a signal 6b of a predetermined value T (zero or little larger than zero), thereby taking the inputted values as they are when they are larger than T, and zeros when they are smaller than T. The picture inputted from the picture memory 104 contains the edge of the background and that of the moving object, while the picture inputted from the picture memory 105 contains only the edge of the background. With respect to the positive portions of the images of these edges, the output of the picture memory 105 is subtracted from the output of the picture memory 104 for each corresponding picture element, and the value 1j of the results is outputted as it is as an edge image regarding the image of the moving object when it is positive, while zero is outputted when said value is smaller than T. FIGS. 7(a) to 7(e) show schematically the respective processings of the signals. It is assumed that an input picture and a background image are given signals having such luminance levels as shown in the highest places of the figure, respectively. In each of FIGS. 7(a) to 7(e), the abscissa is an axis of space, while the ordinate shows the intensity of light. When an input picture including a background image as shown in FIG. 7(a) is taken, the edge image of the input picture and that of the background image as shown in FIG. 7(b) as well as the positive portions thereof as shown in FIG. 7(c), are obtained. When the output of the picture memory 105 is subtracted from the output of the picture memory 104, an edge which exists in the input picture and not in a background picture (i.e. an edge relating to the moving object) shows a positive value, and an edge which does not exist in the input picture, but exists in the background picture (i.e. an edge of the background hidden behind the moving object) shows a negative value, as shown in FIG. 7(d). Accordingly, an edge image relating to the moving object can be obtained from the positive portions of these data, as shown in FIG. 7(e). This information can be outputted as it is.

Referring back to FIG. 6, the comparison and background edge image renewal unit 106 calculates a weighted mean with respect to each picture element in the picture memories 104 and 105 and provides a value of the picture memory 105 afresh, thereby forming or renewing the edge image of the background.

Namely, a multiplier 603 executes multiplication of a preset value ($2^n - 1$) and data of picture elements obtained from the picture memory 105, and outputs the result to an adder 604. The adder 604 adds the output from the multiplier 603 and the data 1g of picture element from the picture memory 104 and outputs the result to a n-bit shifter 605. The n-bit shifter 605 shifts the output from the adder 604 to the right by a preset value (n) and outputs the result to the picture memory 105. A memory device controller 606 controls address lines and control lines so as to correctly execute writing and reading to the picture memories 104 and 105. The controller 606 outputs addresses of picture elements to be processed to the picture memories 104 and 105 through signals 6g, 6h and sets the picture memories 104 and 105 in a state to be ready to read. The data of the corresponding picture elements of the picture memories 104 and 105 are outputted as signals 1g and 1h. The data is processed in the difference calculator 601 and the comparator 602 to output a signal 1j relating to a moving edge image. The controller 606 is left in the state to output the above-mentioned addresses, and set the picture memory 105 in a state to be ready to write in a proper time. As a result, the background edge image stored in the picture memory 105 can be renewed through a signal 1i as follows:

$$BK_{new}(x, y) = \frac{(2^n - 1) \cdot BK_{old}(x, y) + I(x, y)}{2^n},$$

wherein $BK_{new}(x,y)$: data of picture elements relating to a renewed background enhanced edge image in the coordinates (x,y), $BK_{old}(x,y)$: data of picture elements relating to the background edge image before the renewal in the coordinates (x,y), $I(x,y)$: data of the picture elements relating to an edge image of the input picture in the coordinates (x,y), and n: a preset value.

The above operation is repeated at a time one frame.

Figure 8:
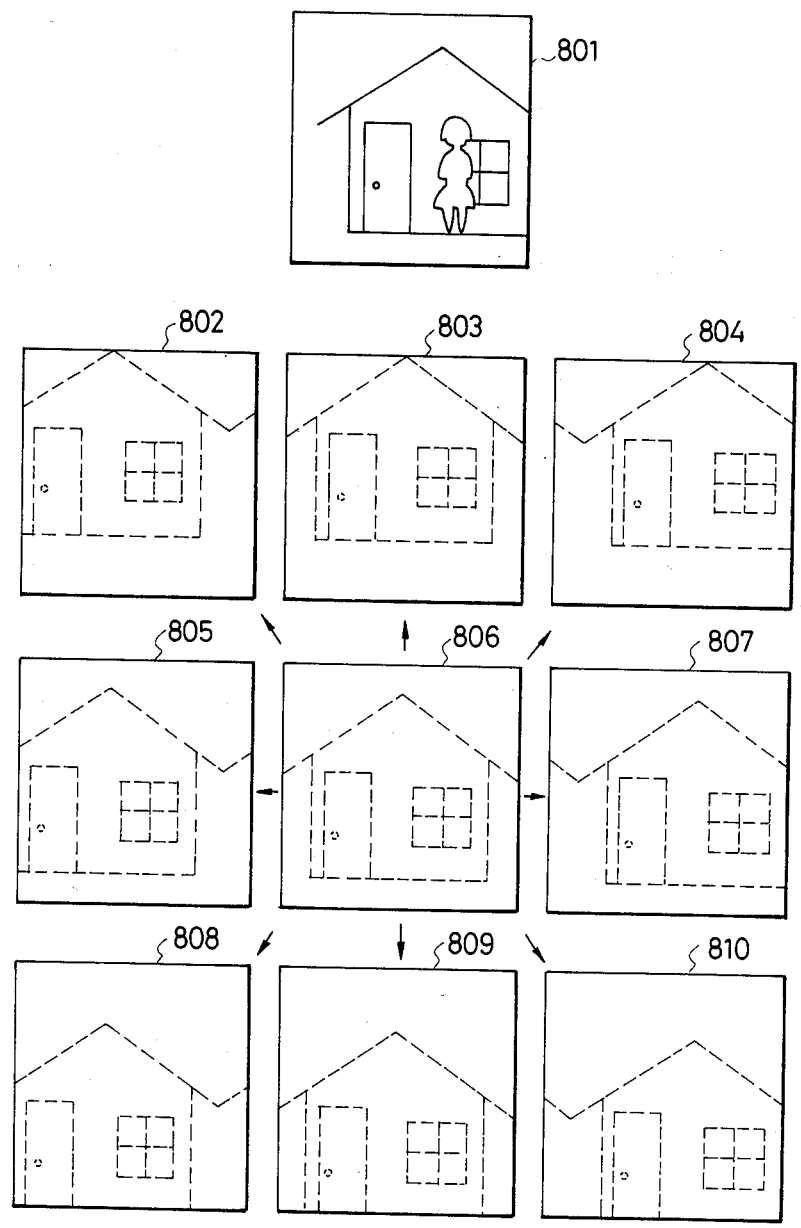
FIG. 8 is illustrational views of picture frames which are objects for computation of correlation values.
Figure 9:
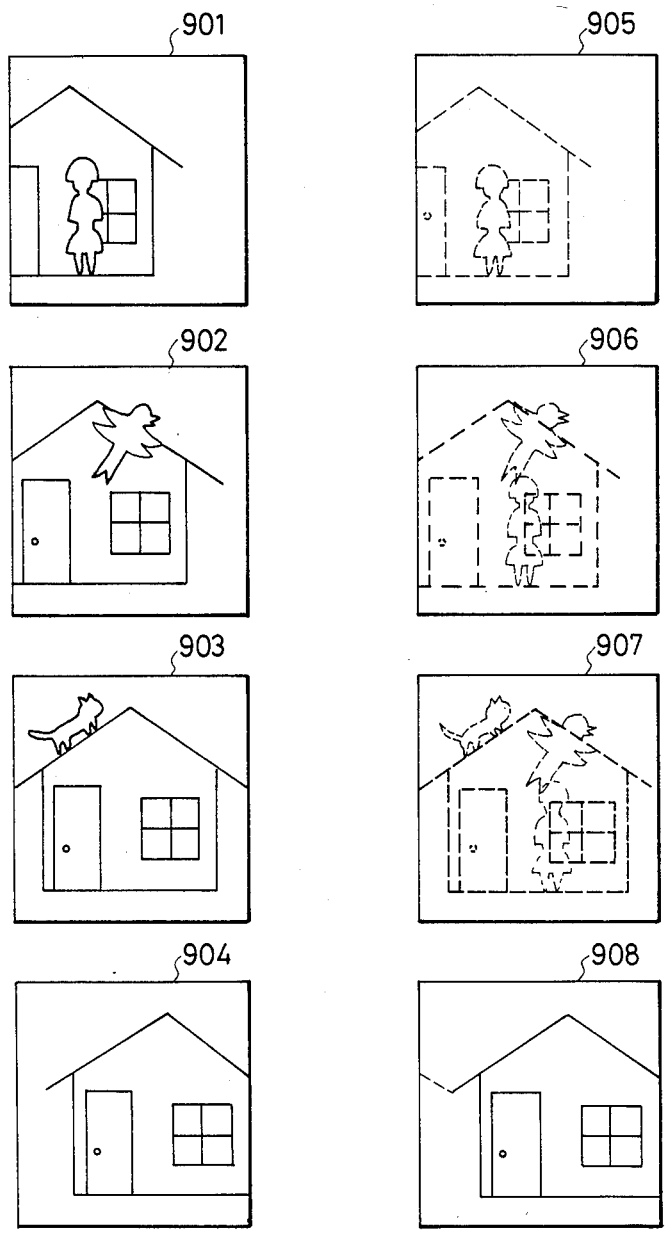
FIG. 9 is illustrational views of picture frames for showing processes wherein a background image is formed.

Referring to FIGS. 8 and 9, operations of extracting the image of a moving object which are executed by the system having the above-described construction will be shown hereunder schematically. 806 of FIG. 8 shows a background edge image stored in the picture memory 105. The representation by broken lines shows that the background edge image has not been completed. When an image 801 is inputted, the correlation values thereof with images 802 to 810 are calculated by the unit 106. In the present case, the correlation values with 801 to 807 are the highest irrespective of the presence of noise (the fragment of a roof) caused by the parallel transfer of the image and the presence of a human image. After the image stored in picture memory 105 is transferred in parallel, the image 801 is compared picture element by picture element. As a result, only the human image contained in the image 801 is extracted as the image of a moving object. Next, the background edge image in the picture memory 105 is renewed by using the image 801. FIG. 9 shows processes in which this background edge image is formed. 901, 902, 903 and 804 show edge images of an input picture, while 905, 906, 907 and 908 show processes in which an edge image of a background is formed. It is assumed that the picture memory 105 in which the edge image of the background is stored is cleared at the beginning. When an input picture 901 containing images of a man and a house is inputted, these images are stored faintly as a background image as shown in 905. When an input image 902 containing images of a bird and the house is inputted subsequently, correlation values are calculated as shown in FIG. 8, the image of 905 is transferred in parallel in accordance with these values, and an image thus obtained is renewed by the image 902. In other words, the image of the house being present continuously is enhanced as shown in 906, and the image of the bird is stored faintly, while the image of a man not being present this time turns more faint. When an input image 903 containing images of a cat and the house is inputted, likewise, the image of the house is further enhanced. Finally, an image 908 is formed as the edge image of the background irrespective of the movement of the image pick-up element 101.

According to the present embodiment, a picture processing system can be constructed in which only the edge image of a moving object can be extracted irrespective of the movement of the image pick-up element 101 within a plane perpendicular to an optical axis.

While the amount of movement of the image pick-up element 101 is assumed to be equivalent to one picture element on a picture plane in the present embodiment, the same mechanism can be designed also with respect to two, three or more picture elements, and a system for extracting the image of a moving object can be constructed in the same way.

The present invention can be utilized for picture processing relating to a moving object, etc., since the edge image of the moving object can be extracted without using a large-scale system, such as a large-sized computer, and at high speed.

What is claimed is:

1. A method of extracting an image of a moving object from an image inputted successively, said method comprising the steps of:

extracting a feature parameter of said inputted image;

storing said feature parameter of said input image as a feature paramter of a background image, said feature parameter of said background image being unchanged or slowly changing;

transferring said feature parameter of said background image so as to correspond positionally to a feature parameter of an image successively inputted;

forming a feature parameter of background image free of any moving object images, based on a weighted mean between said transferred feature parameter of said background image and said feature parameter of said image inputted successively, only said transferred feature parameter of said background image being weighted; and extracting information relating to an image of said moving object from said feature parameter of said image through comparison of said feature parameter of said background image free of any moving object image and said feature parameter of said image inputted successively.

2. A method of extracting an image of a moving object according to claim 1, wherein said feature parameter of said background image is transferred in parallel longitudinally and laterally so as to correspond positionally to said feature parameter of said input image according to a correlated value between said feature parameter of said background image and said feature parameter of said input image.

3. A method of extracting an image of a moving object according to claim 2, wherein an image obtained by extraction of said feature parameter from said input image is an edge image.

4. A method of extracting an image of a moving object, according to claim 3, further including a step of renewing said feature parameter of said background image based on a weighted mean calculated from said feature parameter of said background image free of any moving object image and a feature parameter of an input image successively inputted, said feature parameter of said background free of any moving object image being weighted.

5. A method of extracting an image of a moving object from a picture inputted successively, said method comprising the steps of;

taking a picture by means of an image pick-up element moving within a plane perpendicular to an optical axis so as to output video signals;

converting the video signals into digital signals and storing the digital signals as data of an input image;

extracting a feature parameter from said input image data to provide data representing an edge enhanced image, said edge enhanced image data including data of a moving object and a background;

storing data of the edge enhanced image for one frame of the input image in a first memory as data of a background edge image;

storing data of the edge enhanced image for another frame in a second memory data of an input edge image;

calculating a correlation between the background edge image stored in said first memory and data of an edge enhanced image forwarded successively and stored in said second memory to produce transferring data necessary to make the background edge image correspond positionally to the input edge image;

transferring the background edge image so that the background edge image corresponds positionally to the input edge image, based on the transferring data;

forming a background edge image free of any moving object edge image by obtaining a weighted mean between data of the input edge image from said second memory and data of the background edge image from said first memory, and storing the weighted mean thus obtained in said first memory as said background edge image;

extracting data of an edge image of a moving object through comparison between the data of the background edge image transferred on the basis of said transferring data and the data of an input edge image successively inputted and including the moving object edge image and the background edge image; and renewing the background edge image in said first memory based on a weighted mean between the background edge image in said first memory and the input edge image in said second memory.

6. A method according to claim 5, wherein the correlation is calculated for each picture element on the basis of nine adjacent picture elements, and the background edge image is transferred in the first memory through a parallel transfer so that the background edge image corresponds to one of the nine adjacent picture elements that has the highest correlated value.

7. The method according to claim 5, wherein the background edge image is transferred in the first memory within one picture element in each of at most two directions of right, left, up and down directions.

8. The method according to claim 5, wherein the edge image of the moving object is extracted from the edge enhanced input image of an input picture by subtracting the background edge image transferred based on the correlated value from the edge enhanced input image.

* * * * *